United States Patent Office.

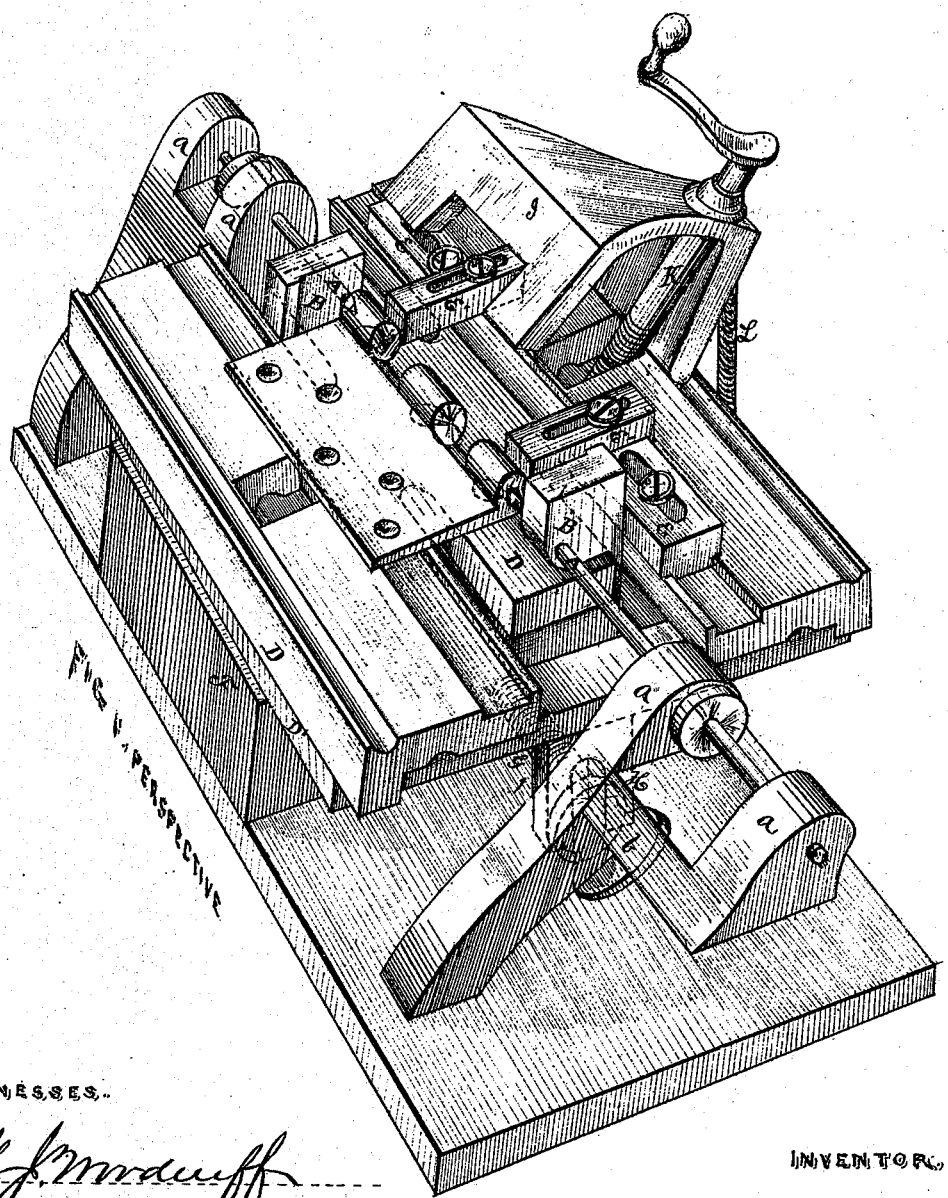

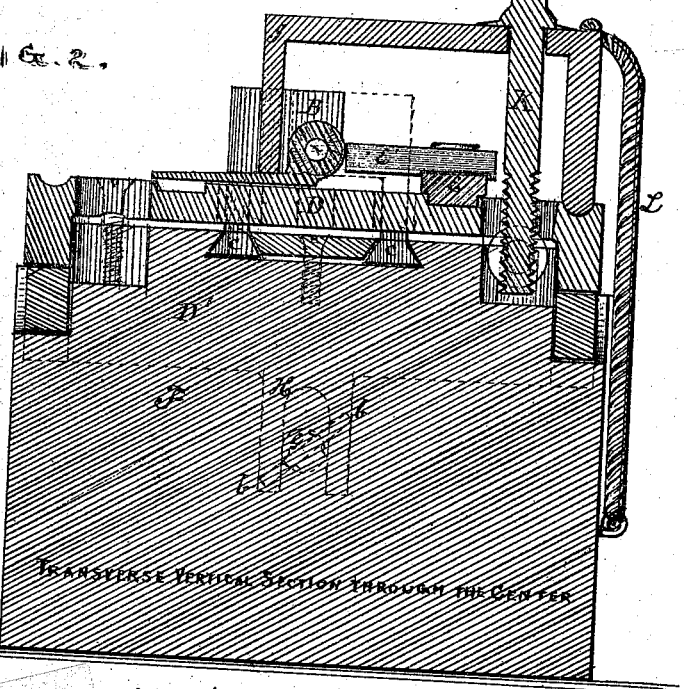

EMERY PARKER, OF NEW BRITAIN, CONNECTICUT, ASSIGNOR TO RUSSELL & ERWIN MANUFACTURING COMPANY, OF SAME PLACE.

Letters Patent No. 105,488, dated July 19, 1870.

IMPROVED MACHINE FOR CENTERING BUTTS.

The Schedule referred to in these Letters Patent and making part of the same

*To all whom it may concern:*

Be it known that I, EMERY PARKER, of New Britain, in the county of Hartford and State of Connecticut, have invented a new and useful Machine for Centering Butts; and I do hereby declare that the following specification, taken in connection with the accompanying drawing making a part of the same, is a full, clear, and exact description thereof.

Figure 1 is a view in perspective.

Figure 2 is a transverse vertical section.

Figure 3 represents both right and left-handed rests for the drill.

The purpose of the machine hereinafter described is to provide an apparatus for centering the holes for the joint pins of butt-hinges, preparatory to drilling such holes through the axes of the knuckles of the hinge.

It would be quite practicable with this machine to complete the holes, but there are certain economical reasons which make it preferable that the holes should be first accurately started or centered, and then, afterward, drilled by another operation.

A A are two drills, which are mounted in suitable bearings *a a*, and are driven by power. Their axes are perfectly coincident, and each drill is furnished with a rest, B, (figs. 1 and 3,) which works in dovetail grooves *c*, (fig. 2,) and is fitted to be adjusted at any distance from the point of the drill which may be necessary.

The drills, while revolving, should be capable of being moved for a limited distance in the line of their axes by devices well understood, and not necessary to be represented in the drawing.

D is a flat-surfaced table, upon which the leaf of the hinge to be centered is placed; and E E' are, respectively, back-rests and gauges, made adjustable to accommodate hinges of different sizes, and to determine the position of the hinges upon the table.

The table D rests upon a wedge-piece, D', the under side of which is inclined at an angle to a horizontal plane of, say thirty degrees, more or less, and the top surface of the base-piece F, which supports both wedge D' and table D, is inclined at a corresponding angle.

When the wedge D' and the base-piece F are so placed that their inclined surfaces are complementary, it is clear that the plane of the table D will be raised or lowered as the wedge D' is moved up or down the inclined surface of the base-piece F.

A convenient means for adjusting the elevation of the plane of the table D is the screw G, which is tapped into a hole in the base F, and is worked by a thumb-piece, *b*.

A yoke, H, depends from the front under edge of the wedge D', and embraces the shank of the screw G between two flanges on such shank, and, by turning said screw to the right or to the left, the wedge will be advanced or drawn backward, and the table D be elevated or lowered.

For holding the leaf of the hinge firmly upon the table, a clamp-nut, I, may be used, which is made to press upon the surface of the hinge when the screw K is turned, and to tilt backward clear of the hinge, by the reaction of the spring L, so soon as the screw K is slackened.

The machine is adapted for centering the leaves of jointed hinges, or of loose jointed butts, both right and left-handed, though it will be necessary to shift the rests for the drills when it is proposed to change from right to left-handed butts, and provision is made for such cases by extra rests suited to butts of different hands which are fitted to the dovetail grooves *a*.

What I claim as my invention, and desire to secure by Letters Patent, is—

The improved machine for centering the holes for joint-pins of hinges, which consists of the following elements in combination: The drills A A, adjustable rests B B, and table D, with mechanism for adjusting it vertically, said table being provided with gauges E E', substantially as described.

EMERY PARKER.

Witnesses:
M. J. WOODRUFF,
H. E. RUSSELL, 2d.